(12) United States Patent
Nigam et al.

(10) Patent No.: US 12,026,413 B1
(45) Date of Patent: Jul. 2, 2024

(54) MACHINE-LEARNING SYSTEM AND PRINT-QUEUE BASED ESTIMATOR FOR PREDICTING WAIT TIMES

(71) Applicant: STARBUCKS CORPORATION, Seattle, WA (US)

(72) Inventors: Harsh Nigam, Renton, WA (US); Michael J. Harlach, Castle Pines, CO (US); Zach A. Thieme, Maple Valley, WA (US); Shadi Hassani Goodarzi, Durham, NC (US); Kelly L. Broad, Seattle, WA (US); Ross W. Marshall, Shoreline, WA (US); John J. Schultz, Everett, WA (US); Matthew A. Scheid, Seattle, WA (US); Chadwick C. Meyer, Seattle, WA (US); Omobolaotan O. Agbonile, Ithaca, NY (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/588,754

(22) Filed: Feb. 27, 2024

Related U.S. Application Data

(63) Continuation of application No. 18/230,987, filed on Aug. 7, 2023, now Pat. No. 11,941,311.

(51) Int. Cl.
  *G06F 3/12* (2006.01)

(52) U.S. Cl.
  CPC ............ *G06F 3/126* (2013.01); *G06F 3/1204* (2013.01); *G06F 3/1285* (2013.01)

(58) Field of Classification Search
  None
  See application file for complete search history.

(56) References Cited

U.S. PATENT DOCUMENTS

| | | | | |
|---|---|---|---|---|
| 2002/0087376 A1* | 7/2002 | Sugimoto | ............... | G06Q 30/02 705/7.41 |
| 2009/0076875 A1* | 3/2009 | Lert, Jr. | ................. | G07C 11/00 705/14.3 |
| 2020/0242553 A1* | 7/2020 | Zhang | ................... | H04W 4/025 |

* cited by examiner

*Primary Examiner* — Frantz Bataille
(74) *Attorney, Agent, or Firm* — Kilpatrick Townsend & Stockton LLP

(57) ABSTRACT

In one example, a system can receive an order from a client device. The system can also receive data about a set of print queues at a set of printers via a network. The system can then determine a set of queue times corresponding to the set of print queues. Each respective queue time can be determined based on a corresponding print queue. The system can generate an estimated wait time for the order based on the set of queue times. The system can then transmit the estimated wait time to the client device for display in a graphical user interface to a user associated with the order.

20 Claims, 7 Drawing Sheets

MACHINE-LEARNING SYSTEM AND PRINT-QUEUE BASED ESTIMATOR FOR PREDICTING WAIT TIMES

REFERENCE TO RELATED APPLICATIONS

This application is a continuation of co-pending U.S. patent application Ser. No. 18/230,987, filed Aug. 7, 2023, titled "Machine-Learning System and Print-Queue Estimator For Predicting Wait Times," the entirety of which is hereby incorporated by reference herein.

TECHNICAL FIELD

The present disclosure relates generally to machine-learning systems. More specifically, but not by way of limitation, this disclosure relates to a machine-learning system and a print-queue-based estimator for predicting wait times.

BACKGROUND

A production location can be any location that manufactures (e.g., produces or assembles) one or more types of physical products. Examples of a production location can include a manufacturing facility or a store. The physical products can include printed circuit boards, robots, beverages, food, batteries, clothing, sensors, pumps, etc. Entities such as customers can submit orders to production locations for such physical products. In some cases, the production locations may provide estimated wait times to the entities indicating how long it will take to fulfill the orders.

SUMMARY

One example of the present disclosure includes a system comprising a plurality of printers at a store; one or more processors communicatively coupled to the plurality of printers via a network; and one or more memories including instructions that are executable by the one or more processors for causing the one or more processors to perform operations. The operations can include receiving, from a client device, a submission of an order to be fulfilled at the store. The operations can include receiving data about a plurality of print queues at the plurality of printers via the network. The operations can include determining a plurality of queue times corresponding to the plurality of print queues, each respective queue time of the plurality of queue times being determined based on a corresponding print queue of the plurality of print queues and being an estimated length of time required to create a respective set of items associated with the corresponding print queue. The operations can include generating an estimated wait time for the order based on the plurality of queue times. The operations can include transmitting the estimated wait time to the client device for display in a graphical user interface to a user associated with the order.

Another example of the present disclosure includes a method. The method can include receiving, by one or more processors and from a client device, a submission of an order to be fulfilled at a store. The method can include receiving, by the one or more processors, data about a plurality of print queues at a plurality of printers via a network. The method can include determining, by the one or more processors, a plurality of queue times corresponding to the plurality of print queues, each respective queue time of the plurality of queue times being determined based on a corresponding print queue of the plurality of print queues and being an estimated length of time required to create a respective set of items associated with the corresponding print queue. The method can include generating, by the one or more processors, an estimated wait time for the order based on the plurality of queue times. The method can include transmitting, by the one or more processors, the estimated wait time to the client device for display in a graphical user interface to a user associated with the order.

Yet another example of the present disclosure can include a non-transitory computer-readable medium comprising program code that is executable by one or more processors for causing the one or more processors to perform operations. The operations can include receiving, from a client device, a submission of an order to be fulfilled at a store. The operations can include receiving data about a plurality of print queues at a plurality of printers via a network. The operations can include determining a plurality of queue times corresponding to the plurality of print queues, each respective queue time of the plurality of queue times being determined based on a corresponding print queue of the plurality of print queues and being an estimated length of time required to complete a respective set of items associated with the corresponding print queue. The operations can include generating an estimated wait time for the order based on the plurality of queue times. The operations can include transmitting the estimated wait time to the client device for display in a graphical user interface to a user associated with the order.

DETAILED DESCRIPTION

Figure 1:
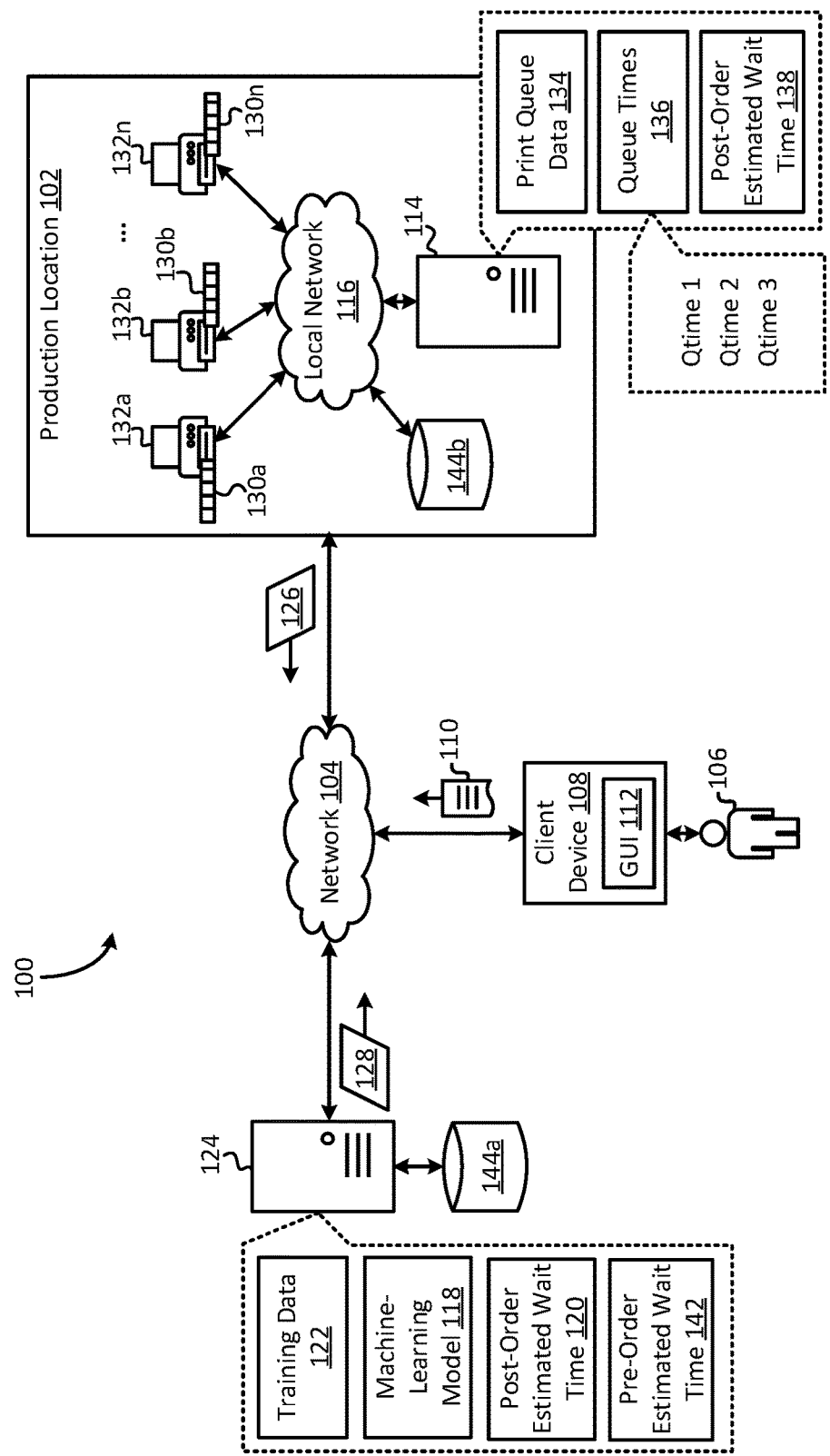
FIG. 1 shows a block diagram of an example of a system according to some aspects of the present disclosure.

Some examples of the present disclosure relate to a machine-learning system for generating an estimated wait time for an order at a store. The estimated wait time can be an estimated amount of time until the order is ready. More specifically, after an order is submitted to a store, a computer system at the store may attempt to use a trained machine-learning model to generate an estimated wait time for the order. For example, the computer system can transmit a request for the estimated wait time to a server system that includes the trained machine-learning model. The server system may be remote from the store, such as in the cloud. If the server system is functioning properly, it may execute the trained machine-learning model to generate an estimated wait time for the order. The server system can then transmit the estimated wait time to the computer system at the store. The computer system, in turn, can provide the estimated wait time to a user that submitted the order.

The trained machine-learning model may have a relatively high degree of accuracy, but may also require a considerable amount of computing resources (e.g., processing power, memory, storage, etc.) to execute. Thus, offloading the estimation processing from the store's local computer system to the server system may improve speed and reduce resource consumption by the computer system. This can allow the computer system to more efficiently perform other computer tasks, like order handling and printer control.

In some cases, the server system may not being functioning properly. For example, the server system may have gone offline or otherwise not respond to the computer system's request. This may result in a failure of the request. The computer system can detect that the request has failed and may fall back to a secondary estimation process. The secondary estimation process can be implemented locally (e.g., at the store) by the computer system. The secondary estimation process can rely on print queue data from one or more printers that are onsite at the store to generate an estimated wait time for the order. This secondary estimation process may be less accurate, but also less computationally intensive, than the primary machine-learning approach. After generating the estimated wait time using the secondary estimation process, the computer system can then provide that estimated wait time to the user that submitted the order.

Using the above techniques, the computer system can first attempt to use the more accurate machine-learning approach to generate an estimated wait time for an order. If it fails, the computer system can revert back to a less accurate, but also less computationally intensive, print-queue approach to generate the estimated wait time for the order. This can help ensure that the user is provided with an estimated wait time either way, without overburdening the store's computer system.

In some examples, the computer system can also provide an estimated wait time to the user before the user actually submits the new order. This can be referred to as a pre-order estimated wait time. For example, the computer system at the store can communicate with the server system to request a pre-order estimated wait time associated with the new order. The server system can generate the pre-order estimated wait time using an averaging technique that is based on existing orders and independent of the items in the new order. This may be beneficial in the pre-order context, while users are still building their orders and making changes. Because the averaging technique is independent of the items in the new order, the estimated wait time does not need to be recomputed each time a user updates the order, which can conserve a considerable amount of computing resources (e.g., as compared to the first two techniques that may depend on the items in the order). The server system can return the pre-order estimated wait time to the computer system, which can then provide it to the user.

These illustrative examples discuss the general subject matter provided here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 according to some aspects of the present disclosure. The system 100 includes a production location 102 at which one or more types of physical products may be manufactured. Examples of the production location 102 can include a store, such as a cafe or eatery. Users can operate client devices to create and submit orders to the production location 102 via a network 104, such as a local area network or the Internet.

In FIG. 1, the user 106 is operating the client device 108 to create and submit an order 110 to the production location 102. To do so, the user 106 can interact with a software application (e.g., a mobile application or a website browser) executing on the client device 108. In particular, the user 106 may interact with a graphical user interface (GUI) 112 output by the client device 108. The GUI 112 can include various graphical options and features through which the user 106 can build an order 110, for example in a cart, and then finally submit the order 110 for processing.

The client device 108 may be any suitable type of computing device, such as a kiosk, a payment terminal, a mobile phone, a laptop computer, a desktop computer, a tablet, or a wearable device (e.g., a smart watch). In some examples, the client device 108 can be remote from the production location 102, as shown in FIG. 1. For instance, the client device 108 can include a mobile phone or laptop computer that is located remotely from the production location 102. Alternatively, the client device 108 can be located at the production location 102. For instance, the client device 108 may be a kiosk or register located inside the production location 102. When the client device 108 is located at the production location 102, the user 106 may be a worker (e.g., employee) or a guest (e.g., customer) at the production location 102. When the user 106 is a worker at the production location 102, the user 106 may operate the client device 108 to place the order 110 on behalf of a guest at the production location 102.

As the user 106 builds the order 110, the system 100 can determine and present a pre-order estimated wait time 142 to the user 106. A pre-order estimated wait time is an estimated amount of time until the order is complete, where the estimate is provided prior to the actual submission of the order. This may help the user 105 decide if and where they want to place the order 110. If the production location 102 would take too long to complete the order 110, the user 106 may decide to place the order at another production location 102 or forego placing the order 110 altogether. In some examples, the user 106 can select which production location is to handle their order 110 via the GUI 112 and may adjust their selection based on the pre-order estimated wait time 120.

To determine the pre-order estimated wait time 142, in some examples the system 100 can perform an averaging technique. For example, a computer system 114 at the production location 102 can determine that the user 106 is creating the order 110. Based on determining that the user 106 is creating the order 110, the computer system 114 can transmit a request 126 for the pre-order estimated wait time 142 to a server system 124. The server system 124 can receive the request and responsively perform the averaging technique, which is described in greater detail later on, to determine the pre-order estimated wait time 142. The server system 124 can then transmit the pre-order estimated wait time 142 in a response 1228 to the request 126 to the computer system 114. The computer system 114, in turn, can transmit the pre-order estimated wait time 132 to the client device 108 for display to the user 106 in the GUI 112. Since the pre-order estimated wait time 142 is computed using an averaging technique, it can be relatively fast and require a relatively small amount of computing resources (e.g., processing power and memory). The averaging technique can also be independent of the order 110, which can make this technique particularly well suited to pre-order estimation, where the user 106 are still creating the order 110 and may make several changes.

After the user 106 has finished building the order 110, the user 106 can actually submit the order 110. For example, the user 106 can select a "submit" button in the GUI 112 to actually place the order 110 at the production location 102. Submitting the order 110 may involve transmitting the order 110 to the computer system 114 at the production location 102. The order 110 can be transmitted to the computer system 114 via one or more networks 104, 116. The computer system 114 can receive the order 110 and determine a post-order estimated wait time. A post-order estimated wait time is an estimated amount of time until the order is complete, where the estimate is provided after the actual submission of the order.

To generate the post-order estimated wait time, in some examples the system 100 may employ a first technique that uses a trained machine-learning model 118. Examples of the trained machine-learning model 118 can include a neural network, a support vector machine, a decision tree, or any combination of these. In some examples, the trained machine-learning model 118 can be an ensemble of models. The machine-learning model 118 may have been previously trained using training data 122, which can include historical information related to the production location 102. Since training and executing a machine-learning model 118 can require a relatively large amount of computing resources, the trained machine-learning model 118 can be executed by the server system 124, which can be remote from the production location 102. This can offload some of the data processing from the computer system 114 to the server system 124, which can improve processing speeds of the computer system 114 at the production location 102.

To use the trained machine-learning model 118, the computer system 114 can transmit a request 126 for an estimated wait time to the server system 124, for example to an application programming interface (API) of the server system 124. The request 126 may include the order details and other associated data, such as the current staffing at the production location 102 and the current equipment that is operational at the production location 102. The server system 124 may receive the request 126 and, in response, execute the trained machine-learning model 118 to generate an estimated wait time 120 for the order 110. This may involve providing some or all of the request data as input to the trained machine-learning model 118 to receive the estimated wait time 120 as output from the trained machine-learning model 118. After generating the estimated wait time 120, in some examples the server system 124 can provide the estimated wait time 120 to the computer system 114 in a response 128 to the request 126. The computer system 114, in turn, can forward the estimated wait time 120 to the client device 108 for display to the user 106 in the GUI 112. Alternatively, the server system 124 can provide the estimated wait time 120 to the client device 108 for display to the user 106 in the GUI 112. This estimated wait time 120 may be more accurate than the pre-order estimated wait time 142 described above, though it may also require more computing resources to generate.

Additionally or alternatively, the system 100 can employ a second technique that uses print queues to generate a post-order estimated wait time. More specifically, there can be one or more printers 132a-n at the production location 102. Each of the printers 132a-n may be associated with a particular production station at the production location 102. Different types of production tasks can be performed at different production stations. For instance, one production station may be designated for making cold beverages, another production station may be designated for making hot beverages, and still another production station may be designated for making food items. In some examples, the printers 132a-n may be label printers that are configured to print labels for items in an order.

When an order is placed, the computer system 114 can determine which items are in the order and which production stations correspond to those items. The computer system 114 can also determine which printers 132a-b correspond to those production stations. The computer system 114 can then generate new print jobs associated with the items at the identified printers 132a-n. Through this process, the computer system 114 can distribute the items in a single order among various production stations and create corresponding print jobs at the printers 132a-n.

In some examples, the print jobs can be configured to print labels for the items at the production stations. Workers at those production stations can then pull the labels after they are printed, create the corresponding item, and affix the label to the item before delivering it to a recipient. If multiple orders arrive, the computer system 114 can create corresponding print jobs and submit them to the printers 132a-n. At the printers 132a-n, the print jobs can be maintained in the print queues 130a-n and executed in their queued sequence.

When implementing the second technique, the computer system 114 can determine which production stations are associated with the order 110 based on the items in the order 110. The computer system 114 can then interact with the printers 132a-b at those production stations to receive print queue data 134 associated with those printers 132a-b. For example, the computer system 114 can transmit requests for the print queue data 134 to the printers 132a-b and, in response, receive the print queue data 134 from the printers 132a-b. The print queue data 134 can indicate the current print queues 130a-b at the printers 132a-b. The computer system 114 can engage in these communications via a network, such as the Internet or a local network 116 (e.g., a local area network) at the production location 102.

After receiving the print queue data 134, the computer system 114 can determine queue times 136 associated with the print queues 130a-b. A queue time can be the amount of time it would take to create all of the items that are already in the print queue (e.g., except for an item associated with the order 110, if that item has already been added to the print queue). Print queues involving complex items or more total items may have queue times that are longer than print queues with simpler items or fewer total items. To determine a current queue time associated with a printer 132a, the computer system 114 can parse the print queue into its items (e.g., except for the item associated with the order 110), determine an estimated creation time for each of those items, and aggregate those estimated creation times together.

In some examples, the computer system 114 can determine the estimated creation time for a given item by referencing a database 144b, which can include a predefined mapping of items to estimated creation times. If the item cannot be located in the database 144b, the computer system 114 can determine a category assigned to the item. The computer system 114 can then determine an estimated creation time associated with other items in the same category. The computer system 114 can use that estimated creation time as a proxy for the target item. If a category is not assigned to the item, the computer system 114 can use a default creation estimate for the item. In this way, the computer system 114 can determine an estimated creation time for a given item.

After determining the queue times 136, the computer system 114 can determine an estimated wait time 138 for the order 110 based on the queue times 136. For example, the computer system 114 can determine that there are two items in the order 110. A first item in the order 110 may be assigned to a first production station associated with a first printer 132a, and a second item in the order 110 may be assigned to a second production station associated with a second printer 132b. So, the computer system 114 can determine a first queue time associated with the first printer 132a and a second queue time associated with the second printer 132b. The computer system 114 can also determine a first estimated creation time for the first item and a second estimated creation time for the second item. The computer system 114 can then add the first estimated creation time to the first queue time to determine a first estimated wait time for the first item. The computer system 114 can also add the second estimated creation time to the second queue time to determine a second estimated wait time for the second item. Having determined the first estimated wait time and the second estimated wait time, the computer system 114 can determine which of the two is larger. The computer system 114 can use the larger of the two as the estimated wait time 138 for the order 110, since the order 110 may not be considered complete until all of its items have been produced. The computer system 114 can then transmit the estimated wait time 138 to the client device 108 for display to the user 106 in the GUI 112. This estimated wait time 138 may be more accurate than the pre-order estimated wait time 138 described above, though it may also require more computing resources to compute.

In some examples, the system 100 may use the second technique as a fallback if the first technique cannot be performed. For example, the computer system 114 may first attempt to perform the first technique by transmitting the request 126 to the server system 124 and waiting for a response. If the computer system 114 does not receive a response within a predefined time period (e.g., 1 second), or if the computer system 114 receives a failure response, the computer system 114 may determine that the request 126 failed. So, the computer system 114 can then default to the second technique as a fallback. That way, the user 106 is still provided with a post-order estimated wait time, even if the trained machine-learning model 118 cannot be reached.

In some examples, the system 100 can determine an actual wait time for the order 110 and compare it to the pre-order estimated wait time 142, the post-order estimated wait time (e.g., post-order estimated wait time 138), or both. This may allow the system 100 to determine their differences and compute various accuracy metrics. Examples of the accuracy metrics can include absolute error, the number of orders that were accurately predicted, the number of overestimated orders, the number of underestimated orders, the absolute error for underestimated orders, the absolute error for overestimated orders, or any combination of these. The absolute error can be computed as the absolute value of the estimated wait time minus the actual wait time (e.g., abs (estimated—actual)). Orders can be considered "accurately predicted" if the estimated wait time is within a predefined value (e.g., 120s) of the actual wait time. Orders can be considered "overestimated" if the estimated wait time is more than the predefined value from the actual wait time. Orders can be considered "underestimated" if the estimated wait time is less than the predefined value from the actual wait time. Monitoring the accuracy of the estimated wait times can allow for adjustments to be made to improve the accuracy of the system 100 with respect to subsequent estimations. For example, the system 100 may automatically adjust a multiplier value or a buffer value used to compute the post-order estimated wait time 138, as described in greater detail below, based on a difference between the estimated wait time 132 and the actual wait time. As another example, the system 100 may automatically retrain the machine-learning model 118 based on a difference between the post-order estimated wait time 120 and the actual wait time.

Although the above examples involve the server system 124 executing the trained machine-learning model 118, other implementations are also possible. For instance, in some examples the computer system 114 can execute the trained machine-learning model 118 to determine the post-order estimated wait time 120. In these examples, the computer system 114 can use the first technique instead of, or in addition to, the second technique to generate a post-order estimated wait time 120 for the order 110. And in some examples, the server system 124 may execute the second technique. In these examples, the print queue data 134 can be transmitted to the server system 124 (e.g., either by the printers 132a-n themselves or by the computer system 114), which can then implement the second technique and transmit a post-order estimated wait time 138 to the computer system 114. The computer system 114 can then forward the post-order estimated wait time 138 to the client device 108. Thus, the present disclosure is not limited to the specific arrangement shown in FIG. 1.

After computing a post-order estimated wait time for the order 110, in some examples the system 100 can store (e.g., in memory) the post-order estimated wait time for subsequent use. For example, the computer system 114 can store the post-order estimated wait time in a database, such as database 144b. This may be useful for computing pre-order estimated wait times later on for subsequent orders. For example, the computer system 114 can receive a request associated with a new order. In response to receiving the request, the computer system 114 can determine the most-recent X orders that were placed at the production location 102 within a predefined time window, such as the last two hours. X may be any suitable number, such as three, and may be predefined. The computer system 114 may then obtain the stored post-order estimated wait times for each of those prior orders. Having obtained the stored post-order estimated wait times associated with the prior orders, the computer system 114 can compute a pre-order estimated wait time for the new order based on an average (e.g., weighted average) of the post-order estimated wait times for the prior orders. If the average is a weighted average, the computer system 114 can assign a higher weight to more recent orders and lower weight to older orders. Of course, if there was only one order within the predefined time period, then no averaging may be necessary. In that scenario, the computer system 114 can simply use the stored post-order estimated wait time for that single order as the pre-order estimated wait time for the new order. And if there were no orders within the predefined time period, then the computer system 114 can use a default value as the pre-order estimated wait time. Either way, a pre-order estimated wait time can be computed for the new order.

After the pre-order estimated wait time is computed for the new order, the computer system 114 may store the pre-order estimated wait time and reuse it for some or all new orders within a given time interval, such as for every new order in the next five minutes (e.g., so that they all receive the same pre-order estimated wait time). This can avoid performing the averaging process repeatedly, thereby conserving computing resources.

Other ways of computing a pre-estimated wait time are also possible. For instance, although the first technique and second technique were used above to determine a post-order estimated wait time, they can additionally or alternatively be used to determine a pre-order estimated wait time in some examples. Thus, the first and second techniques are not limited to only post-order estimations. But because of their higher computational overhead, it may be beneficial to save those techniques for after an order has actually been placed. Similarly, the pre-order estimation technique described herein may be used for post-order estimation, if desired.

Figure 2:
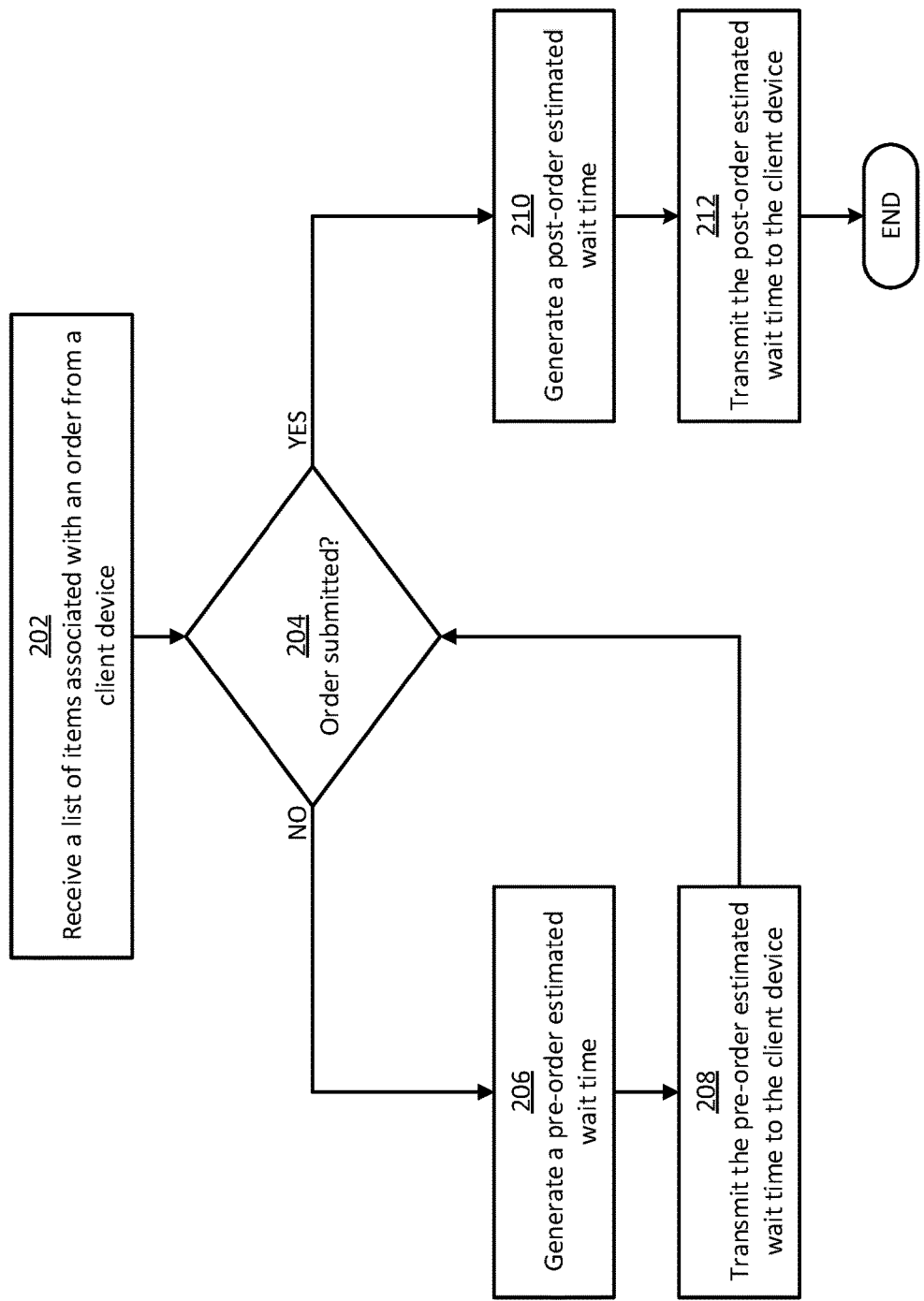
FIG. 2 shows a flowchart of an example of a process for generating pre-order and post-order estimated wait times according to some aspects of the present disclosure.

Turning now to FIG. 2, shown is a flowchart of an example of a process for generating pre-order and post-order estimated wait times according to some aspects of the present disclosure. Other examples may involve more operations, fewer operations, different operations, or a different sequence of operations than is shown. The operations of FIG. 2 are described below with reference to the components of FIG. 1.

For simplicity, the operations of FIGS. 2-6 are described below as being performed by the system 100. Nevertheless, it should be appreciated that some or all of the operations described herein as being performed by the system 100 may in fact be performed by computer system 114, the server system 124, or any combination thereof.

In block 202, a system 100 receives a list of items associated with an order 110 from a client device 108. The order 110 may be in progress or complete. Thus, the list of items may be a partial or complete list of the items that are ultimately included in the order 110. The system 100 can receive the list of items from the client device 108 via the network 104, which may include one or more subnetworks.

Each time a user 106 of the client device 108 makes a change to the order 110, the client device 108 may transmit an updated list of items to the system 100 for use in obtaining an updated pre-order estimated wait time. For instance, the user 106 may be able to add items to the order 110 or remote items from the order 110 as desired at this stage by interacting with a GUI 112 on the client device 108. Each time the user 106 modifies the order 110, the client device 108 can detect the change and transmit an updated list of items reflecting the current order state to the system 100.

In block 204, the system 100 determines whether the order 110 has been submitted. If not, the order 110 can be considered in progress. Otherwise, the order 110 can be considered complete.

If the order is in progress, the process can proceed to block 206. In block 206, the system 100 can generate a pre-order estimated wait time 142. For example, the system 100 can use the averaging technique described above to generate the pre-order estimated wait time 142. As another example, the system 100 can use the machine-learning technique described above to generate the pre-order estimated wait time 142. As still another example, the system 100 can use the print-queue technique described above to generate the pre-order estimated wait time 142.

In block 208, the system 100 transmits the pre-order estimated wait time 142 to the client device 108. The system 100 can transmit the pre-order estimated wait time 142 to the client device 108 via the network 104. The client device 108 can receive the pre-order estimated wait time 142 and output it in a GUI 112 to the user 106.

If the order is complete, the process can proceed to block 210. In block 210, the system 100 can generate a post-order estimated wait time. For example, the system 100 can use the machine-learning technique described above to generate the post-order estimated wait time 120. As another example, the system 100 can use the print-queue technique described above to generate the post-order estimated wait time 138. As still another example, the system 100 can use the averaging technique described above to generate the post-order estimated wait time.

In block 212, the system 100 transmits the post-order estimated wait time to the client device 108. The system 100 can transmit the post-order estimated wait time to the client device 108 via the network 104. The client device 108 can receive the post-order estimated wait time and output it in the GUI 112 to the user 106.

Figure 3:
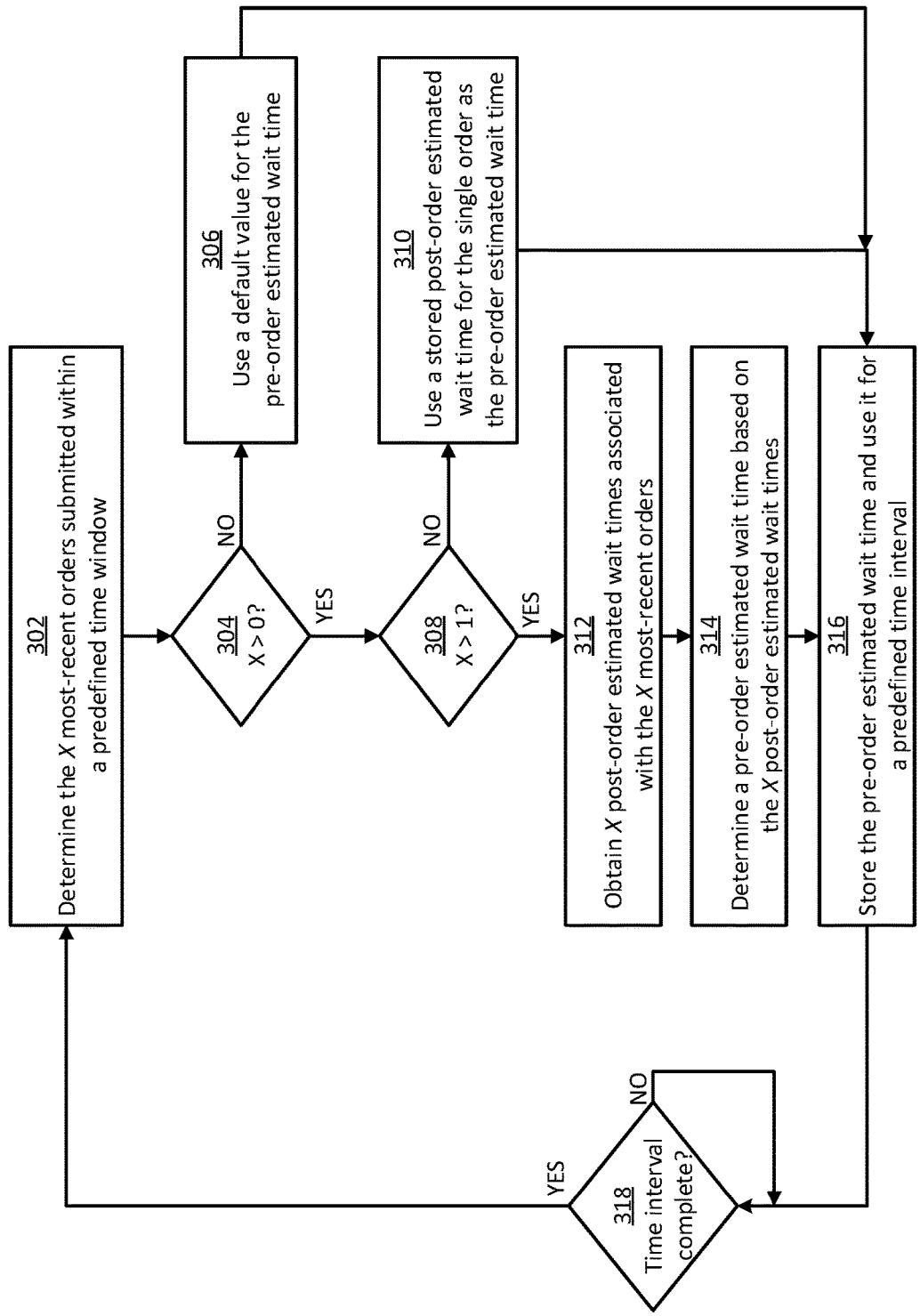
FIG. 3 shows a flowchart of an example of a process for determining a pre-order estimated wait time using an averaging technique according to some aspects of the present disclosure.

Turning now to FIG. 3, shown is a flowchart of an example of a process for determining a pre-order estimated wait time using an averaging technique according to some aspects of the present disclosure. Other examples may involve more operations, fewer operations, different operations, or a different sequence of operations than is shown. The operations of FIG. 3 are described below with reference to the components of FIG. 1.

In block 302, the system 100 determines the X most-recent orders at a production location 102 within a predefined time window. For example, the computer system 114 can determine the three most-recent orders in the last two hours at the production location 102. The computer system 114 can maintain a list of submitted orders and identify the X most-recent orders by timestamp.

In block 304, the system 100 determines whether X is greater than zero. This may occur if there were no new orders in the predefined time window. If X is equal to zero, the process can proceed to block 306 where the system 100 can use a default value for the post-order estimated wait time. One example of the default wait time can be 256 seconds (s). Otherwise, the process can proceed to block 308.

In block 308, the system 100 determines whether X is greater than one. X may not be greater than 1 if there was only one new order in the predefined time window. If X is equal to one, the process can proceed to block 310 where the system 100 can determine a stored post-order estimated wait time for that single order, for example by retrieving the stored value from a database. The system 100 can then use the stored post-order estimated wait time for that single order as the pre-order estimated wait time. Otherwise, the process can proceed to block 312.

In block 312, the system 100 determines X post-order estimated wait times associated with the X most-recent orders, where the X post-order estimated wait times were previously computed for those orders. For example, the system 100 can retrieve the X post-order estimated wait times from a database.

In block 314, the system 100 determines the pre-order estimated wait time for the order 110 based on the X post-order estimated wait times for the X most-recent orders. For example, the system 100 can perform a weighted average using the X post-order estimated wait times to determine the pre-order estimated wait time. The weighted average may weight more recent orders higher than older orders. For example, the weight for a given order may correspond to the amount of time since the order was placed.

As one particular example in which three orders were received within the predefined time window, the weighted average may be computed as follows:

$$\frac{\left(\dfrac{\text{Order1}^{EstimatedWaitTime}}{\text{Seconds since order 1}} + \dfrac{\text{Order2}^{EstimatedWaitTime}}{\text{Seconds since order 2}} + \dfrac{\text{Order3}^{EstimatedWaitTime}}{\text{Seconds since order 3}}\right)}{\left(\dfrac{1}{\text{Seconds since order 1}} + \dfrac{1}{\text{Seconds since order 2}} + \dfrac{1}{\text{Seconds since order 3}}\right)}$$

If the above equation is applied to an example in which Order1 was submitted 340s ago and has an estimated creation time of 90s, Order 2 was submitted 130s ago and has an estimated creation time of 100s, and order3 was submitted 60s ago and has an estimated creation time of 300s, the weighted average may compute to 221s. This value can then be used as the pre-order estimated wait time.

In block 316, the system 100 stores the pre-order estimated wait time (e.g., in a database in memory or storage) and reuses that pre-order estimated wait time for a given time interval, such as the next five minutes. This may conserve computing resources by reusing the same pre-order estimated wait time for that time interval (e.g., for all orders built in that time interval), without having to recompute the pre-order estimated wait time for each new order.

In block 318, after the predefined time interval is complete, the process may return to block 302 and repeat to generate a new pre-order estimated wait time for use during the next time interval. In this way, the system 100 can periodically compute a pre-order estimated wait time and use it for a predefined time interval, which can conserve computing resources.

Figure 4:
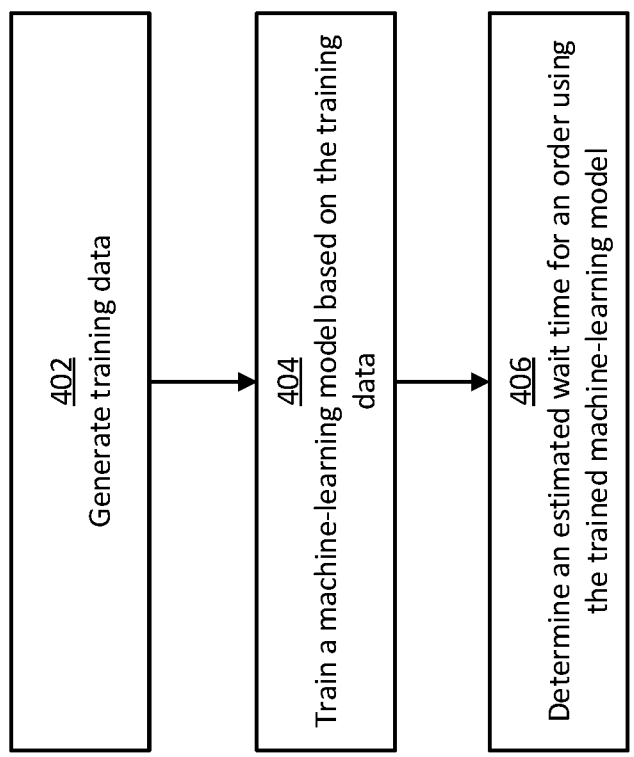
FIG. 4 shows a flowchart of an example of a process for determining an estimated wait time using a machine-learning technique according to some aspects of the present disclosure.

Turning now to FIG. 4, shown is a flowchart of an example of a process for determining an estimated wait time using a machine-learning technique according to some aspects of the present disclosure. Other examples may involve more operations, fewer operations, different operations, or a different sequence of operations than is shown. The operations of FIG. 4 are described below with reference to the components of FIG. 1.

In block 402, the system 100 generates training data 122. The training data 122 can include historical information related to the production location 102 and/or other production locations. For example, a company may be associated with multiple production locations. In some such examples, the historical information can be collected from some or all of those production locations.

The historical information can span a prior time window, such as the last 365 days. The historical information may include actual or estimated wait times for various items made during the prior time window. For example, the historical information can include a time series spanning the prior time window, where the data points in the time series indicate wait times for items created during the prior time window. As one particular example, the historical information can include a time series for a particular item. The data points may be captured in the times series at a one hour interval, so that there are multiple data points associated with the particular item throughout the day, for each day during the prior time window. This can help capture differences in demand and staffing that may occur throughout the day at the production location 102 and impact the wait time for the item. In some examples, the data points can be labeled with additional information, such as the equipment that is operational at the production location 102 and level of staffing at the production location 102 at the time the data point was captured.

If the historical information is collected from multiple production locations, each respective set of historical information may be labeled with the type of production location. This can allow the machine-learning model to learn wait time patterns related to different types of production locations. For instance, in an example in which the production locations are related to a coffeehouse company, there may be different types of production locations such as cafes, drive-thru only locations, etc.

In some examples, the historical information can include print queue data related to the print queues 130a-n at the production location 102. For example, the print queue data can include a set of time series, where each time series can include print queue data collected at a periodic interval from a corresponding one of the printers 132a-n over the prior time window. The print queue data may help the machine-learning model learn how long it takes certain items to be made, from which the model can derive estimated wait times in relation to different types of items and print queues.

In block 404, the system 100 trains a machine-learning model based on the training data 122 to thereby generate the trained machine-learning model 118. This may involve iteratively tuning weights in the machine-learning model to transform it from an untrained state to a trained state. Through the training process, the machine-learning model can learn patterns. For example, the machine-learning model can learn patterns between (i) an item, a store type, a day and time, a level of staffing at the production location 102, and/or operational equipment; and (ii) a wait time for the item.

In block 406, the system 100 determines an estimated wait time 120 for an order 110 using the trained machine-learning model 118. For example, the system 100 can provide the order details (e.g., a list of items in the order 110) as input to the trained machine-learning model 118 and receive an estimated wait time 120 as output from the trained machine-learning model 118. In some examples, the system 100 can also provide other inputs to the machine-learning model 118, such as the time and day, the type of the production location 102, the equipment that is currently operational at the production location 102, and/or the current level of staffing at the production location 102. Based on these inputs, the machine-learning model 118 can generate an overall estimated wait time 120 for the order 110 as a whole. This may involve parsing the order into its component items, predicting a wait time for each item, and then accumulating the predicted wait times to generate the overall estimated wait time 120.

Figure 5:
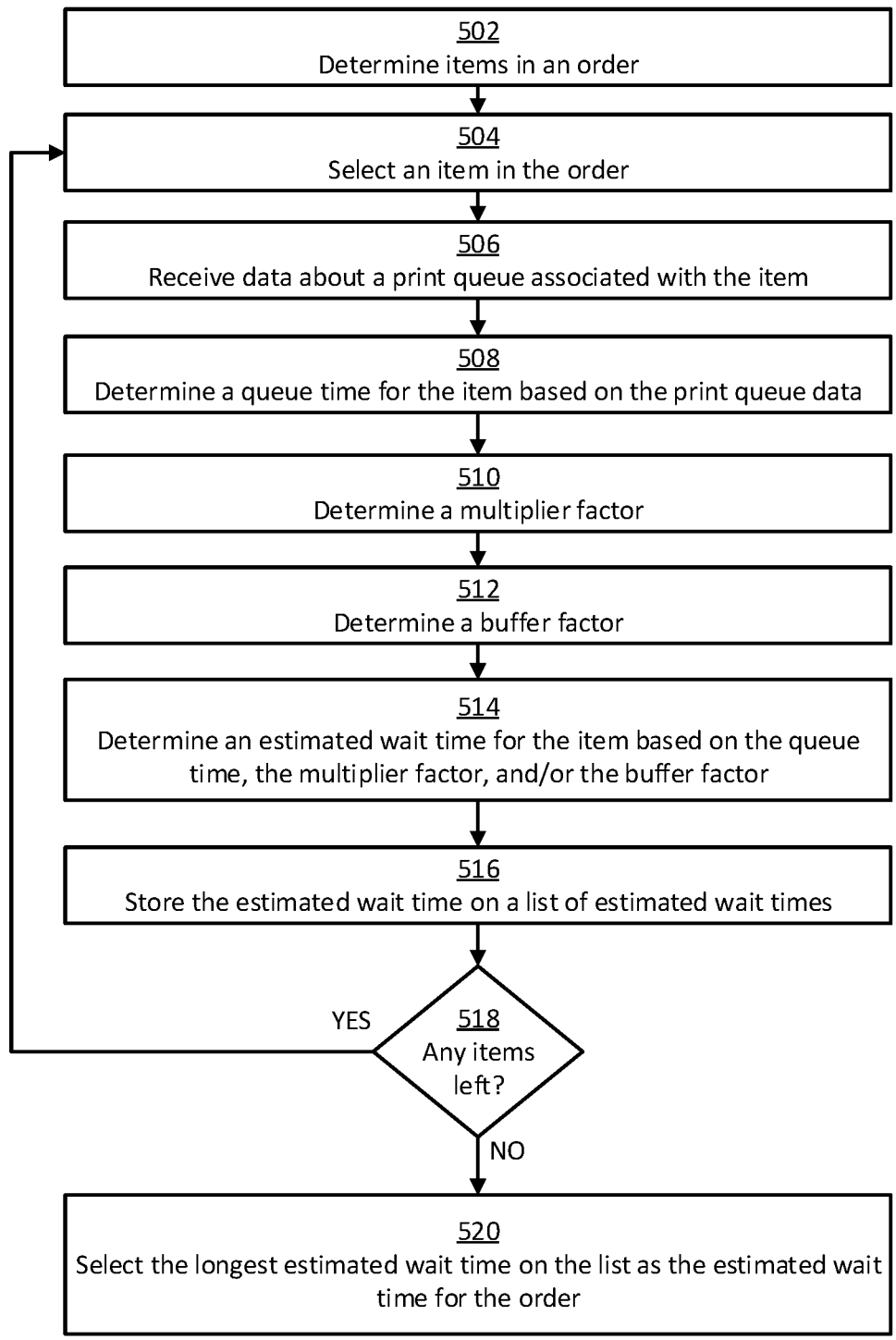
FIG. 5 shows a flowchart of an example of a process for determining an estimated wait time using a print-queue technique according to some aspects of the present disclosure.

Turning now to FIG. 5, shown is a flowchart of an example of a process for determining an estimated wait time using a print-queue technique according to some aspects of the present disclosure. Other examples may involve more operations, fewer operations, different operations, or a different sequence of operations than is shown. The operations of FIG. 5 are described below with reference to the components of FIG. 1.

In block 502, the system 100 determines items in an order 110. There can be any number of items in an order 110. The system 100 can receive the order 110 from a client device 108 of a user 106 and parse the order 110 into its component items.

In block 504, the system 100 selects an item in the order 110 to evaluate. The system 100 may select the item randomly or may use some other technique, such as sequential selection, to select the item.

In block 506, the system 100 receives data about a print queue associated with the item. For example, if the item will be constructed at a certain production station that has printer 132a, the system 100 can receive data about the current print queue 130a at that printer 132a. This may involve the system 100 requesting the print queue data from the printer 132a and receiving the print queue data from the printer 132a in response to the request.

In block 508, the system 100 determines a queue time for the item based on the print queue data. The queue time can be the amount of time it would take to create all of the items that are already in the print queue (e.g., except for the selected item that is under investigation, if it has already been added to the print queue). To determine the queue time, the system 100 can parse the print queue data into its items (e.g., except for the selected item under investigation, if it has already been added to the print queue), determine an estimated creation time for each of those items, and aggregate those estimated creation times together. The system 100 can determine the estimated creation time for a given item using any of the techniques described above. For example, the system 100 can reference a database (e.g., database 144a-b) to determine the estimated creation time for a given item. If the item cannot be located in the database, the system 100 can use the estimated creation times of similar items as a proxy for the target item. Or, the system 100 can use a default creation estimate for the item.

In some examples, an item may contain a product and one or more modifiers. A modifier can be a requested change to the product, such as the addition or subtraction of a component. For instance, the user 106 may request the addition of an ingredient to a drink. If an item includes one or more modifiers, the system 100 can determine an estimated creation time for the item based on the modifiers. For example, the system 100 can determine an estimated creation time for the item based on the number of modifiers and the amount of time it would take to apply each modifier. As one particular example, the system 100 can determine the estimated creation time for an item with one or more modifiers using the following equation:

$$EstimatedCreationTime = ProductCreationTime + (ModifierCount * perModifierTime)$$

where ProductCreationTime can be the estimated amount of time it would take to create the product; ModifierCount can be the number of requested modifiers to the product; and perModifierTime can be a predefined amount of time (e.g., an average amount of time) that it takes to apply a modifier to the product. Different products may have different predefined modifier times and, thus, the appropriate modifier time can be selected by the system 100 for the product under investigation.

In block 510, the system 100 determines a multiplier factor. This can be a predefined value set by an administrator to adjust an estimated weight time calculation to account for various factors, such as parallel production. Parallel production may involve the production location 102 creating multiple of the same item at the same time. For example, if two items in the queue are the same drink, a worker can create both drinks at the same time by simply mixing larger quantities of the drink's ingredients together and splitting the result into two cups. One example of the multiplier factor can be 0.38s.

In block 512, the system 100 determines a buffer factor. This can be a predefined value set by an administrator to adjust an estimated weight time calculation to account for estimation inaccuracies (e.g., overestimation or underestimation). One example of the buffer factor can be 118s.

In block 514, the system 100 determines an estimated wait time for the item based on the queue time, the multiplier factor, and/or the buffer factor. For example, if the item does not have any modifiers, then the estimated wait time for the item can be determined using the following equation:

$$EstimatedWaitTime = (ProductCreationTime + QueueTime) * MultiplierFactor + BufferFactor$$

where EstimatedWaitTime is the estimated amount of time until the item is ready; QueueTime can be the queue time for the item described above; MultiplierFactor can be the multiplier factor described above; and BufferFactor can be the buffer factor described above. Other examples may exclude the MultiplierFactor, the BufferFactor, or both. In some examples, there may be different multiple factors and/or buffer factors for different printers. The appropriate multiple factor and/or buffer factor can be selected based on the printer associated with the print queue.

If the item includes one or more modifiers, then the estimated wait time for the item can be determined according to the following equation:

$$EstimatedWaitTime = (ProductCreationTime + (ModifierCount * perModifierTime) + QueueTime) * MultiplierFactor + BufferFactor$$

In block 516, the system 100 stores the estimated wait time on a list of estimated wait times. The list of estimated wait times may be stored in memory.

In block 518, the system 100 determines if there are any items left in the order 110 to evaluate. If so, the process can return to block 504 and repeat for the next item in the order 110. If there were multiple items in the order 110 assigned to the same printer, after one of those items is analyzed in blocks 504-516, the item can then be considered part of the queue during the next iteration performed for the next one of those items. If the system 100 determines that there are no items left in the order 110 to evaluate, the process can continue to block 520.

At block 520, the system 100 selects the longest estimated wait time on the list as the estimated wait time for the order 110. For example, if the list includes a first estimated wait time of 230s for a first item, a second estimated wait time of 345s for a second item, and a third estimated wait time of 74s for a third item, then system 100 can identify 345s as the longest estimated wait time. The system 100 can then use 345s as the estimated wait time for the order 110, because the order 110 will not be complete until its last item has been created.

Figure 6:
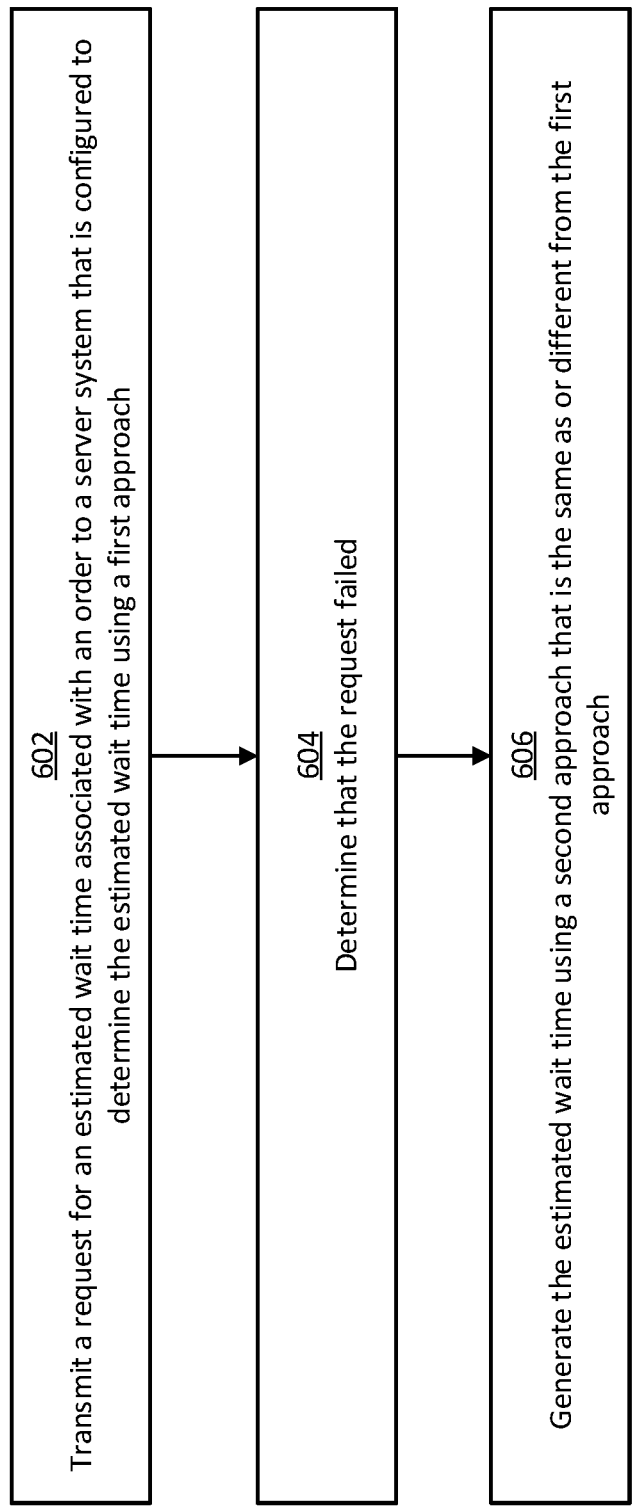
FIG. 6 shows a flowchart of an example of a process for using a second technique to generate an estimated wait time in response to a failed request according to some aspects of the present disclosure.

FIG. 6 shows a flowchart of an example of a process for using a second technique to generate an estimated wait time in response to a failed request according to some aspects of the present disclosure. Other examples may involve more operations, fewer operations, different operations, or a different sequence of operations than is shown. The operations of FIG. 6 are described below with reference to the components of FIG. 1.

In block 602, the computer system 114 transmits a request 126 for an estimated wait time associated with an order 110 to a server system 124. The server system 124 can be configured to determine the estimated wait time using a first approach and provide the estimated wait time to the computer system 114. The first approach may be the averaging technique, the machine-learning technique, or the print-queue technique described above.

In block 604, the computer system 114 determines that the request 126 failed. In some examples, the computer system 114 may determine that the request 126 failed if the computer system 114 does not receive a response with the estimated wait time from the server system 124 within a predefined time period (e.g., 0.5 s). Alternatively, the computer system 114 may determine that the request 126 failed based on receiving a failure notification from the server system 124.

In block 606, the computer system 114 generates the estimated wait time using a second approach. The second approach may be the same as or different from the first approach. For example, the computer system 114 can generate the estimated wait time using the averaging technique, the machine-learning technique, or the print-queue technique described above. The computer system 114 can then provide the estimated wait time to the client device 108 and/or the server system 124.

In the process described above, operations 602-606 were performed by the computer system 114. But in other examples, the server system 124 can perform these operations. For example, the server system 124 can transmit a request for an estimated wait time associated with an order 110 to computer system 114. The computer system 114 can be configured to generate the estimated wait time using a first approach and provide the estimated wait time to the server system 124, which may then provide estimated wait time to the client device 108 of the user 106. But if the server system 124 determines that the request failed, the server system 124 can generate the estimated wait time using a second approach, which may be the same as or different than the first approach. The server system 124 can then provide the estimated wait time to the client device 108 and/or the computer system 114.

Figure 7:
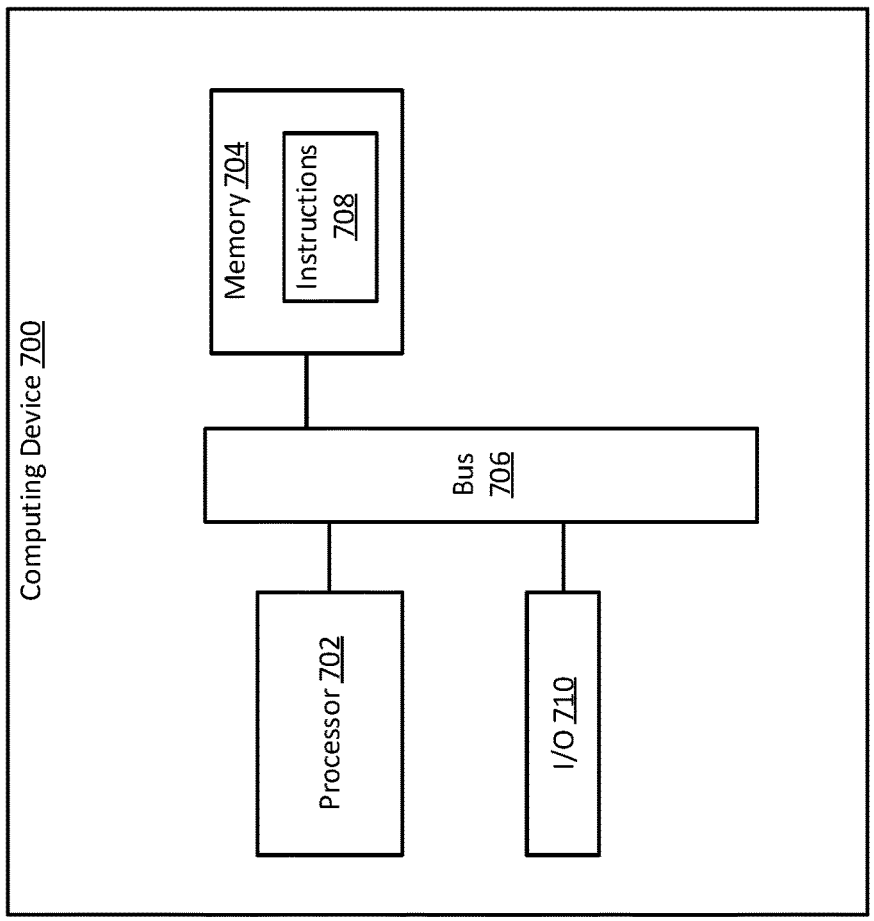
FIG. 7 shows a block diagram of an example of a computing device usable to implement some aspects of the present disclosure.

FIG. 7 shows a block diagram of an example of a computing device 700 usable to implement some aspects of the present disclosure. In some examples, the computing device 600 may be part of the server system 124, the computer system 114, or the client device 108 of FIG. 1.

The computing device 700 includes a processor 702 coupled to a memory 704 via a bus 706. The processor 702 can include one processing device or multiple processing devices. Examples of the processor 702 include a Field-Programmable Gate Array (FPGA), an application-specific integrated circuit (ASIC), a microprocessor, or any combination of these. The processor 702 can execute instructions 708 stored in the memory 704 to perform operations. Examples of such operations can include any of the techniques described above to determine an estimated wait time for an order. In some examples, the instructions 708 can include processor-specific instructions generated by a compiler or an interpreter from code written in any suitable computer-programming language, such as C, C++, C #, Python, or Java.

The memory 704 can include one memory device or multiple memory devices. The memory 704 can be volatile or non-volatile, such that the memory 704 retains stored information when powered off. Examples of the memory 704 include electrically erasable and programmable read-only memory (EEPROM), flash memory, or any other type of non-volatile memory. At least some of the memory device includes a non-transitory computer-readable medium from which the processor 702 can read instructions 708. A computer-readable medium can include electronic, optical, magnetic, or other storage devices capable of providing the processor 702 with computer-readable instructions or other program code. Examples of a computer-readable medium can include magnetic disks, memory chips, ROM, random-access memory (RAM), an ASIC, a configured processor, optical storage, or any other medium from which a computer processor can read the instructions 708.

The computing device 700 may also include input and output (I/O) components 710. Examples of the input components can include a mouse, a keyboard, a microphone, a trackball, a touch pad, a touch-screen display, or any combination of these. Examples of the output components can include a visual display such as a LCD display or a touch-screen display; an audio display such as speakers; a haptic display such as a piezoelectric device or an eccentric rotating mass (ERM) device; or any combination of these.

The above description of certain examples, including illustrated examples, has been presented only for the purpose of illustration and description and is not intended to be exhaustive or to limit the disclosure to the precise forms disclosed. Various modifications, adaptations, and uses thereof will be apparent to those skilled in the art without departing from the scope of the disclosure. For instance, any examples described herein can be combined with any other examples to yield further examples.

The invention claimed is:

1. A computing system comprising:
one or more processors; and
one or more memories including instructions that are executable by the one or more processors for causing the computing system to perform operations including:
receiving a submission of an order to be fulfilled at a store, wherein the submission is received by the computing system from a client device that is remote from the computing system;
in response to receiving the submission of the order, transmitting a request for an estimated wait time over a network to a server system, wherein the server system is remote from the client device and the computing system, and wherein the server system includes a trained machine-learning model that is executable to generate estimated wait times for orders;
determining that the request transmitted to the server system failed;
in response to determining that the request failed:
receiving print queue data from a plurality of printers at the store, wherein the print queue data includes a plurality of print queues at the plurality of printers; and
generating the estimated wait time based on the print queue data that was received from the plurality of printers at the store; and
transmitting the estimated wait time to the client device for display in a graphical user interface to a user associated with the order.

2. The computing system of claim 1, wherein the operations further comprise:
determining a plurality of queue times based on the print queue data received from the plurality of printers; and
determining the estimated wait time based on the plurality of queue times.

3. The computing system of claim 2, wherein a print queue of the plurality of print queues includes a set of items, and wherein the operations further comprise:
- determining a plurality of estimated creation times associated with the set of items;
- determining a queue time associated with the print queue based on the plurality of estimated creation times; and
- determining the estimated wait time based on the queue time.

4. The computing system of claim 3, wherein determining the queue time involves adding together the plurality of estimated creation times.

5. The computing system of claim 3, wherein the print queue includes a list of queued print jobs, the queued print jobs being for printing a set of labels for the set of items.

6. The computing system of claim 2, wherein the operations further include, prior to receiving the submission of the order:
- generating a pre-order estimated wait time based on a weighted average of at least two post-order estimated wait times corresponding to at least the last two orders that were transmitted to the store within a prior time window; and
- transmitting the pre-order estimated wait time to the client device for display in the graphical user interface to the user.

7. The computing system of claim 2, wherein the server system is configured to:
- train a machine-learning model based on training data to produce the trained machine-learning model, the training data including historical information related to the store;
- execute the trained machine-learning model to generate a predicted wait time for the order at the store; and
- transmit the predicted wait time to the computing system.

8. The computing system of claim 2, wherein the operations further comprise generating the estimated wait time for the order by:
- determining, based on the plurality of print queues associated with the plurality of printers, a plurality of wait times for a plurality of items in the order;
- selecting a longest wait time from the plurality of wait times; and
- determining the estimated wait time for the order based on the longest wait time.

9. A method comprising:
- receiving, by one or more processors of a computing system, a submission of an order to be fulfilled at a store, wherein the submission is received by the computing system from a client device that is remote from the computing system;
- in response to receiving the submission of the order, transmitting, by the one or more processors of the computing system, a request for an estimated wait time over a network to a server system, wherein the server system is remote from the client device and the computing system, and wherein the server system includes a trained machine-learning model that is executable to generate estimated wait times for orders;
- determining, by the one or more processors of the computing system, that the request failed;
- receiving, by the one or more processors of the computing system, print queue data from a plurality of printers at the store, wherein the print queue data includes a plurality of print queues at the plurality of printers;
- in response to determining that the request failed, generating, by the one or more processors of the computing system, the estimated wait time based on the print queue data that was received from the plurality of printers at the store; and
- transmitting, by the one or more processors of the computing system, the estimated wait time to the client device for display in a graphical user interface to a user associated with the order.

10. The method of claim 9, further comprising:
- determining, by the computing system, a plurality of queue times based on the print queue data received from the plurality of printers; and
- determining, by the computing system, the estimated wait time based on the plurality of queue times.

11. The method of claim 10, wherein a print queue of the plurality of print queues includes a set of items, and further comprising:
- determining, by the computing system, a plurality of estimated creation times associated with the set of items;
- determining, by the computing system, a queue time associated with the print queue based on the plurality of estimated creation times; and
- determining, by the computing system, the estimated wait time based on the queue time.

12. The method of claim 11, wherein determining the queue time involves adding together the plurality of estimated creation times.

13. The method of claim 11, wherein the print queue includes a list of queued print jobs, the queued print jobs being for printing a set of labels for the set of items.

14. The method of claim 9, further comprising, prior to receiving the submission of the order:
- generating a pre-order estimated wait time based on a weighted average of at least two post-order estimated wait times corresponding to at least the last two orders that were transmitted to the store within a prior time window; and
- transmitting the pre-order estimated wait time to the client device for display in the graphical user interface to the user.

15. The method of claim 9, wherein the server system is configured to:
- train a machine-learning model based on training data to produce the trained machine-learning model, the training data including historical information related to the store;
- execute the trained machine-learning model to generate a predicted wait time for the order at the store; and
- transmit the predicted wait time to the computing system.

16. The method of claim 9, further comprising generating the estimated wait time for the order by:
- determining, based on the plurality of print queues associated with the plurality of printers, a plurality of wait times for a plurality of items in the order;
- selecting a longest wait time from the plurality of wait times; and
- determining the estimated wait time for the order based on the longest wait time.

17. A non-transitory computer-readable medium comprising program code that is executable by one or more processors of a computing system for causing the computing system to perform operations including:
- receiving a submission of an order to be fulfilled at a store, wherein the submission is received by the computing system from a client device that is remote from the computing system;

in response to receiving the submission of the order, transmitting a request for an estimated wait time over a network to a server system, wherein the server system is remote from the client device and the computing system, and wherein the server system includes a trained machine-learning model that is executable to generate estimated wait times for orders;

determining that the request transmitted to the server system failed;

receiving print queue data from a plurality of printers at the store, wherein the print queue data includes a plurality of print queues at the plurality of printers;

in response to determining that the request failed, generating the estimated wait time based on the print queue data that was received from the plurality of printers at the store; and transmitting the estimated wait time to the client device for display in a graphical user interface to a user associated with the order.

18. The non-transitory computer-readable medium of claim 17, wherein the operations further comprise:

determining a plurality of queue times based on the print queue data received from the plurality of printers; and determining the estimated wait time based on the plurality of queue times.

19. The non-transitory computer-readable medium of claim 18, wherein a print queue of the plurality of print queues includes a set of items, and wherein the operations further comprise:

determining a plurality of estimated creation times associated with the set of items;

determining a queue time associated with the print queue based on the plurality of estimated creation times; and determining the estimated wait time based on the queue time.

20. The non-transitory computer-readable medium of claim 19, wherein determining the queue time involves adding together the plurality of estimated creation times.

* * * * *

UNITED STATES PATENT AND TRADEMARK OFFICE
CERTIFICATE OF CORRECTION

Page 1 of 1

PATENT NO. : 12,026,413 B1
APPLICATION NO. : 18/588754
DATED : July 2, 2024
INVENTOR(S) : Harsh Nigam et al.

It is certified that error appears in the above-identified patent and that said Letters Patent is hereby corrected as shown below:

On the Title Page

Item (72) Please add Flavio Arion Bahia Diomede Seattle, WA as an Inventor.

Signed and Sealed this
Twenty-seventh Day of May, 2025

Coke Morgan Stewart
*Acting Director of the United States Patent and Trademark Office*